United States Patent
Fallis et al.

(10) Patent No.: US 7,307,985 B1
(45) Date of Patent: Dec. 11, 2007

(54) METHOD AND SYSTEM FOR AUTOMATICALLY ROUTING A DIAL PLAN THROUGH A COMMUNICATIONS NETWORK

(75) Inventors: Kevin Michael Fallis, Overland Park, KS (US); Kenneth James Aubuchon, Lenexa, KS (US); Kay Ellen Mitchell, Kansas City, MO (US); Stephan Dwayne Thomasee, Gladstone, MO (US); Daniel Christopher Wieschhaus, Shawnee, KS (US); Zbigniew Mastylo, Olathe, KS (US); Peter Tarlos, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 971 days.

(21) Appl. No.: 10/727,871

(22) Filed: Dec. 4, 2003

(51) Int. Cl.
*H04I 12/50* (2006.01)
(52) U.S. Cl. ................................ 370/357; 370/355
(58) Field of Classification Search ................ 370/357
See application file for complete search history.

(56) References Cited

U.S. PATENT DOCUMENTS

| | | | | |
|---|---|---|---|---|
| 4,625,308 | A * | 11/1986 | Kim et al. | 370/321 |
| 5,481,601 | A * | 1/1996 | Nazif et al. | 379/201.03 |
| 6,889,385 | B1 * | 5/2005 | Rakib et al. | 725/119 |
| 7,016,378 | B1 * | 3/2006 | Dasika et al. | 370/535 |
| 7,068,663 | B1 * | 6/2006 | Adler | 370/395.51 |

* cited by examiner

*Primary Examiner*—Creighton Smith (57) ABSTRACT

A method and system for identifying switch and trunk-group combinations and updating switches, or other components, required to implement a dial plan is provided. The method includes receiving a source network-element identifier and a destination network-element identifier. A range of NPA-NXX codes are received and all available communications pathways between the first network element and the second network element upon which data bound for the one or more NPA-NXX codes can be routed are automatically identified. Profile information associated with the destination network element is retrieved, and, without user intervention, a routing update command is automatically generated that configures the transmitting network element to route data bound for the NPA-NXX codes across the identified communications pathways.

26 Claims, 4 Drawing Sheets

METHOD AND SYSTEM FOR AUTOMATICALLY ROUTING A DIAL PLAN THROUGH A COMMUNICATIONS NETWORK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of routing data through a communications network. More particularly, the present invention relates to the field of automatically updating network components that terminate to multiple devices.

BACKGROUND OF THE INVENTION

A telecommunications network is composed of a variety of components, including switches, routers, signal-control points, and a litany of other network elements. Switches communicate data through trunks and trunk groups. A trunk is a communications pathway such as a group of circuits that carry traffic in and out of a switch or a channel connecting multiple exchanges. Data is routed through a communications network by identifying source and destination points. For instance, telephone numbers are associated with central offices or switches according to the Local Exchange Routing Guide (LERG).

The LERG is a dynamic reference that identifies NPA-NXX routing information as well as network-element and equipment designation. Well known in the art, the LERG contains a listing of local routing data such as destination codes, switching entities, rate centers, and locality information. An NPA can be an area code. There are two general categories of NPAs: geographic and nongeographic. Geographic NPAs route data based on geographic destinations whereas nongeographic NPAs (such as 800, 900, 700, etc.) route data independent of geographic destination. The NXX code (central office code or CO code) is typically a three-digit switch-entity indicator that is defined by the "D," "E," and "F" digits of a 10-digit telephone number within the North American Numbering Plan (NANP). An NXX code can currently contain 10,000 station numbers. The NANP is the numbering plan currently used in the United States and other locales such as Canada, Bermuda, Puerto Rico, and certain Caribbean Islands. The NANP format is a 10-digit number that consists of a 3-digit NPA code (Area Code), 3-digit NXX code (Exchange), and 4-digit code (Line).

As new NPA-NXX codes are provided by the LERG, they need to be associated with one or more devices, typically first and second end-offices identified by respective Common Language Location Identifiers (CLLI). A CLLI is a standard unique identifier that states the location of a network element. Thus, a network-translations analyst must route the NPA-NXX to the appropriate CLLI(s) so that the data can then be communicated on to a local switch or end device. But this has historically been a crude manual process, even when analysts were only concerned with routing an NPA-NXX to a single destination point.

As networks grow, however, some COs must receive multiple trunk groups, further compounding the difficulty of attempting to properly associate NPA-NXX codes with CLLI codes and building out the routing of the applicable switches. Some calls can route over some of the trunk groups while some calls cannot. Moreover, additional networks may need to be added to a first network, creating the possibility for multiple—rather than single—terminating sets of trunk groups and/or switches for the same NPA-NXX range. The multiple terminating switches may be from different vendors, further complicating the building of correct switch-update transactions. Switches made by different vendors are often updated with different update strings. If the process were manual, individuals would need to learn how to format switch-update commands for each of the types of switches to be updated. The more terminating switches, and the more data that needs to be provided, the greater the likelihood is that an analyst will mis-key in data or otherwise input erroneous routing information. Providing erroneous routing data or a bad switch-update transaction can cause great problems within a communications network, not limited to calls not being connected, calls routed to erroneous destinations, or even customers having no service at all.

There is a need for a method and system that automatically identifies switch/trunk-group combinations that are required to implement a dial plan where multiple trunk groups terminate to a common device. The current state of the art could be improved by a system that automatically configures routes and updates switches incident to receiving an NPA-NXX address and one or more termination-device identifiers.

SUMMARY OF THE INVENTION

The present invention solves at least the above problems by providing a system and method that automatically identifies all of the terminating switches ("term switches") and all trunk groups associated with implementing a dial plan. The present invention has several practical applications in the technical arts including reducing the probability of errors historically associated with routing new NPA-NXX codes. Moreover, the present invention facilitates the management of multiple term switches, simplifies handling of new networks and network-element types, supports new technologies with term/CLLI relationships, simplifies the addition of an automated feed, and achieves standardization by using industry-standard CLLIs to manage route lists.

In one aspect of the present invention, a set of embodied computer-useable instructions are provided for identifying trunk groups to implement a dial plan. A range of data-destination identifiers, such as an NPA-NXX range, is received along with a Point-of-Presence (POP) CLLI and a Termination CLLI. A set of trunk groups and switches (or other devices) associated with the identifiers are identified. One or more input parameters are received so that without user input switch-update transactions are automatically generated and communicated to the respective switch(es).

In another aspect of the invention, a method is provided for automatically updating a telecommunications device to route data based on a dialing-plan modification where the telecommunications device terminates to multiple destinations. The method includes receiving a source Common Language Location Identification (CLLI) and a destination CLLI. Without user intervention, the present invention determines a set of communications pathways between the source CLLI and the destination CLLI and identifies one or more switches that need to be updated to direct data based on the dialing-plan.

In another aspect, a method is provided for updating a telecommunications switch to route data associated with one or more NPA-NXX codes where the switch terminates multiple destinations. A source network-element identifier is received that corresponds to a transmitting network element. A destination network-element identifier is received that corresponds to a receiving network element. One or more NPA-NXX codes are received and the present invention automatically identifies all available communications pathways between the first network element and the second network element upon which data bound for the one or more NPA-NXX codes can be routed. The present invention automatically obtains profile information associated with the destination network element and without user intervention automatically generates a routing command that, when processed by the transmitting network element, configures the transmitting network element to route data bound for the NPA-NXX codes across the communications pathways.

In a final exemplary aspect, the present invention is a computer-implemented method for automatically assigning an NPA-NXX range to an end office. The present invention receives a switch identifier, a Point of Presence (POP) identifier, and then based on the switch identifier and the POP identifier automatically identifies a set of communications pathways associated with the switch identifier and the POP identifier. Without user intervention, the present invention automatically updates a switch associated with the switch identifier to route data bound for the NPA-NXX range through the identified set of communications pathways.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides an apparatus and method for automatically routing a dial plan through a communications network. The present invention will be better understood from the detailed description provided below and from the accompanying drawings of various embodiments of the invention. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AT | Access Tandem |
| CLLI | Common Language Location Identification |
| EO | End Office |
| NPA | Numbering Plan Area (Area Code) |
| NXX | Prefix - first three digits of telephone number after NPA |
| POP | Point Of Presence |
| POP CLLI | CLLI that identifies a point of presence |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a telecommunications network. Although the present invention can be employed in connection with a telecommunications-networking environment, it should be construed as limited to the applications provided here for illustrative purposes. Accordingly, FIG. 1 indicates an exemplary operating environment suitable for practicing the present invention. The illustrative operating environment should not be construed as a limitation of the present invention. Additional components that can be used in connection with the present invention are not shown so as to not obscure the present invention.

Figure 1:
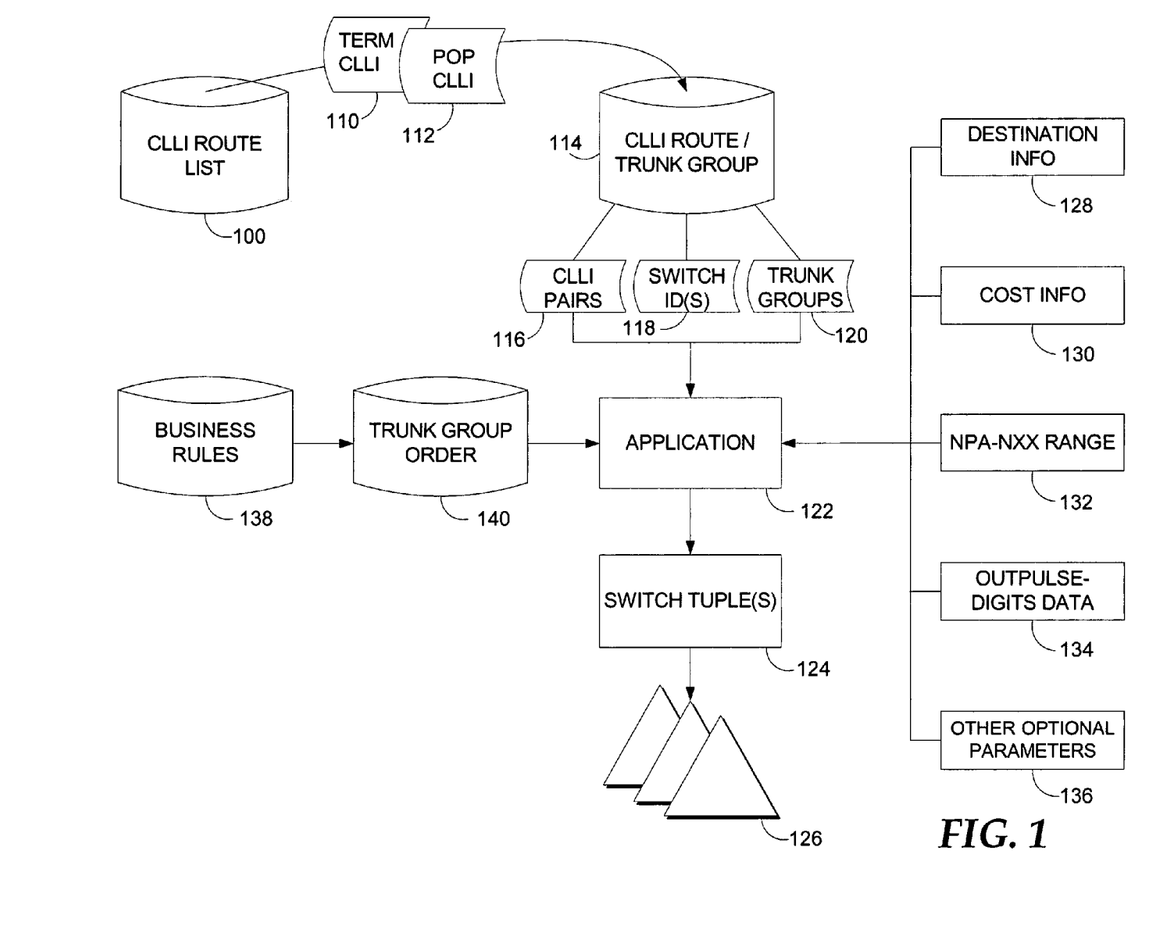
FIG. 1 depicts an exemplary operating environment suitable for practicing an embodiment of the present invention.

FIG. 1 depicts a CLLI route list 110. As previously indicated, a CLLI is a Common Language Location Identifier. A CLLI can be used to identify a variety of network-element types, such as a switch, a router, a hub, a point of presence (POP), and the like. A CLLI route list is a group of CLLI routes that identify a set of possible terminations for a given type of call. A termination is the file destination of a phone call (voice or data, received from a transporting network). In a preferred embodiment, a CLLI route is a combination of a termination CLLI, POP CLLI, and (if available) a hub CLLI that uniquely identifies a path along which data can be routed to a piece of equipment. A Term CLLI, or termination CLLI, is a CLLI that identifies an end office, access tandem, or other piece of routable equipment in a network. A POP CLLI identifies a point of presence, which is a line of demarcation from where a transporting network meets a service provider's connections. A hub CLLI is a group of circuits connected at one point on a network and enables traffic concentration and economies of scale and/or scope. Hubs are typically located in larger cities throughout a network for concentration and call routing from cities with lower traffic demands.

As shown in FIG. 1, a termination CLLI 110 and POP CLLI 112 are derived from a CLLI route list and inputted into a CLLI route/trunk-group table 114. The CLLI route/trunk-group table 114 is a dynamic mechanism that houses information about various trunk groups and types of trunk groups supported by a CLLI route. The CLLI route/trunk-group table 114 will be described in greater detail below with reference to FIG. 3. Table 114 relates termination CLLIs 110, POP CLLIs 112, and switch IDs to trunk groups. A switch ID is typically a company-internal identifier. To the extent switch IDs are employed by a communications carrier, they are applicable here; but the use of switch IDs is not mandatory to the present invention. The corresponding CLLI could be used in its stead, but using switch IDs is explained here to aid the understanding of the present invention. Thus, from CLLI route/trunk-group table 114 an indication of CLLI pairs 116, switch IDs 118, and trunk groups 120 can be provided to an application 122. Application 122 can retrieve additional parameters to generate the necessary switch tuples 124 used to update one or more switches 126. Exemplary additional parameters include destination information 128, cost information 130, an NPA-NXX range 132, a description of outpulse-digits data 134 and other optional parameters 136.

Destination information 128 can include a description of the type of switch to be updated as well as the vendor associated with the switches 126 to be updated. As previously indicated, switches manufactured by different vendors are updated with switch transactions of various formats. Moreover, different types of switches are also updated differently. This switch-description information can be included within destination information 128. Also, if the ultimate destination of the update information is not a switch, but perhaps another device (such as a router, signal transfer point, etc.), then destination information 128 will include information that describes the specific destination network element. A network element can be any communication switch or other piece of equipment in a network used for routing calls or other network activities.

Cost information 130 includes costs associated with routing data according to various paths. For instance, routing data traffic across certain pathways at certain times may cost more than routing the same data across various paths at other times. If data is to be routed through a third party's network, then that third party may charge various rates based on the type of data, the time the data is transmitted, the nature of the data pathway chosen, or various other parameters related to routing data traffic.

NPA-NXX range 132 represents a code composed of an NPA-NXX. An NPA is a numbering plan area, otherwise currently known as an area code. As also previously described, an NXX is a prefix, which is often the first three digits of a telephone number after the NPA. A dial plan may comprise a range of numbers including NPA-NXX, NPA-NXX-LINE, and NPA-NXX-LINE (RANGE) that are terminated to a CLLI Route List.

Thus, NPA-NXX range 132 identifies a range of phone numbers or data-destination identifiers. Although the present invention greatly simplifies updating switch contents related to a given NPA-NXX range, its application should not be construed as limited to updating one or more switches according to NPA-NXX modifications. Outpulse-digits data 134 includes data related to the number of outpulse digits or format of outpulse digits necessary to update the one or more switches 126. Outpulse-digits data 134 may simply be a single number, such as "6," indicating that to update a switch, six digits are necessary. Alternatively, outpulse-digits data 134 may include the actual phone number or phone number range to be updated. In other applications, outpulse-digits data may indicate a certain number such as "10," reflecting that an entire telephone number including area code and the last four digits are necessary.

Other optional parameters 136 may include a variety of different types of data inputs that can be used to provide one or more switch tuples. A set of business rules 138 can be used to determine a specific order for trunk groups and thereby produce a trunk-group-order table 140. The trunk-group-order information in order table 140 can be received by application 122 to determine a hierarchy of trunk groups upon which to route data. For instance, if the information to be communicated is voice information, then a certain trunk group may take precedence over other trunk groups. Similarly, if the information to be communicated is another type of data, such as packet data, then another trunk group or set of trunk groups may take precedence.

Application 122 receives directly or indirectly CLLI pairs 116, switch IDs 118, groups 120 and additional parameters 128-136 to create one or more switch tuples 124. In a preferred embodiment, switch tuples 124 correspond to switch-update transactions. The switch-update transactions are sent to the respective switches 126 to update them consistent with the data provided to application 122. An exemplary method for updating one or more switches or automatically identifying switch and trunk group combinations is illustrated in FIG. 2.

Figure 2:
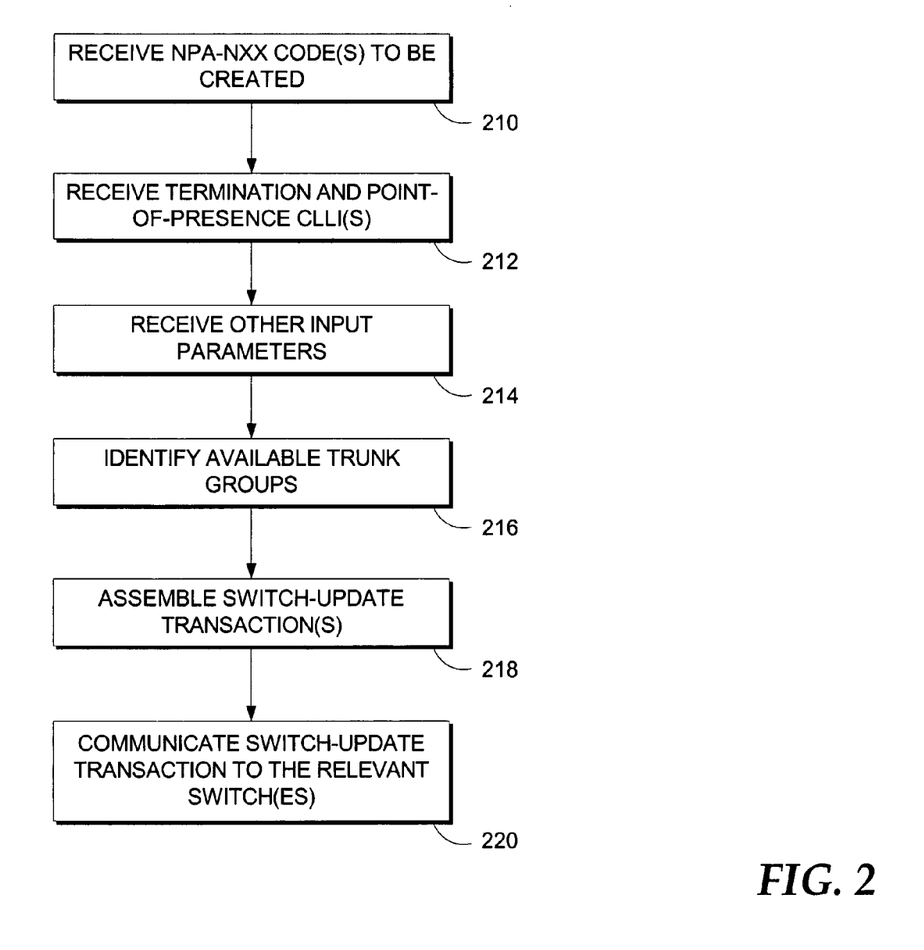
FIG. 2 depicts an exemplary method for updating one or more switches in accordance with an embodiment of the present invention.

Turning now to FIG. 2, an exemplary method for updating one or more switches is referenced generally by the numeral 200. At a step 210, application 122 receives one or more NPA-NXX codes to be created. As previously mentioned, NPA-NXX codes often vary according to the local exchange routing guide (LERG). For instance, if a new city developed in the State of Kansas, and the "913" area code was to be associated with that city, then certain telecommunications switches would need to be updated so that calls made to the 913 area code with a certain NXX prefix would reach that city.

Absent the present invention, however, updating switches where multiple trunk groups can terminate to the same element is difficult. A more detailed example associated with updating one or more switches where multiple trunk groups terminate to a common element will be provided with reference to FIG. 3.

With continued reference to FIG. 2 at a step 212, application 122 receives a CLLI pair 116. In a preferred embodiment the CLLI pair 116 is composed of termination CLLI 110 and POP CLLI 112. At a step 214, application 122 can receive additional input parameters. Exemplary additional input parameters were previously described with reference to numerals 128 through 136. At a step 216, application 122 then identifies all available trunk groups associated with the termination CLLI and POP CLLI provided. The process of identifying the available trunk groups will also be explained in greater detail with reference to FIG. 3. At a step 218, application 122 then assembles one or more switch-update transactions that, when processed by the respective switches, will direct data to be routed to the desired location, which is often a POP. At a step 220, application 122 communicates the switch-update transaction(s)- or other routing-device update transaction—to the relevant switches.

Figure 3:
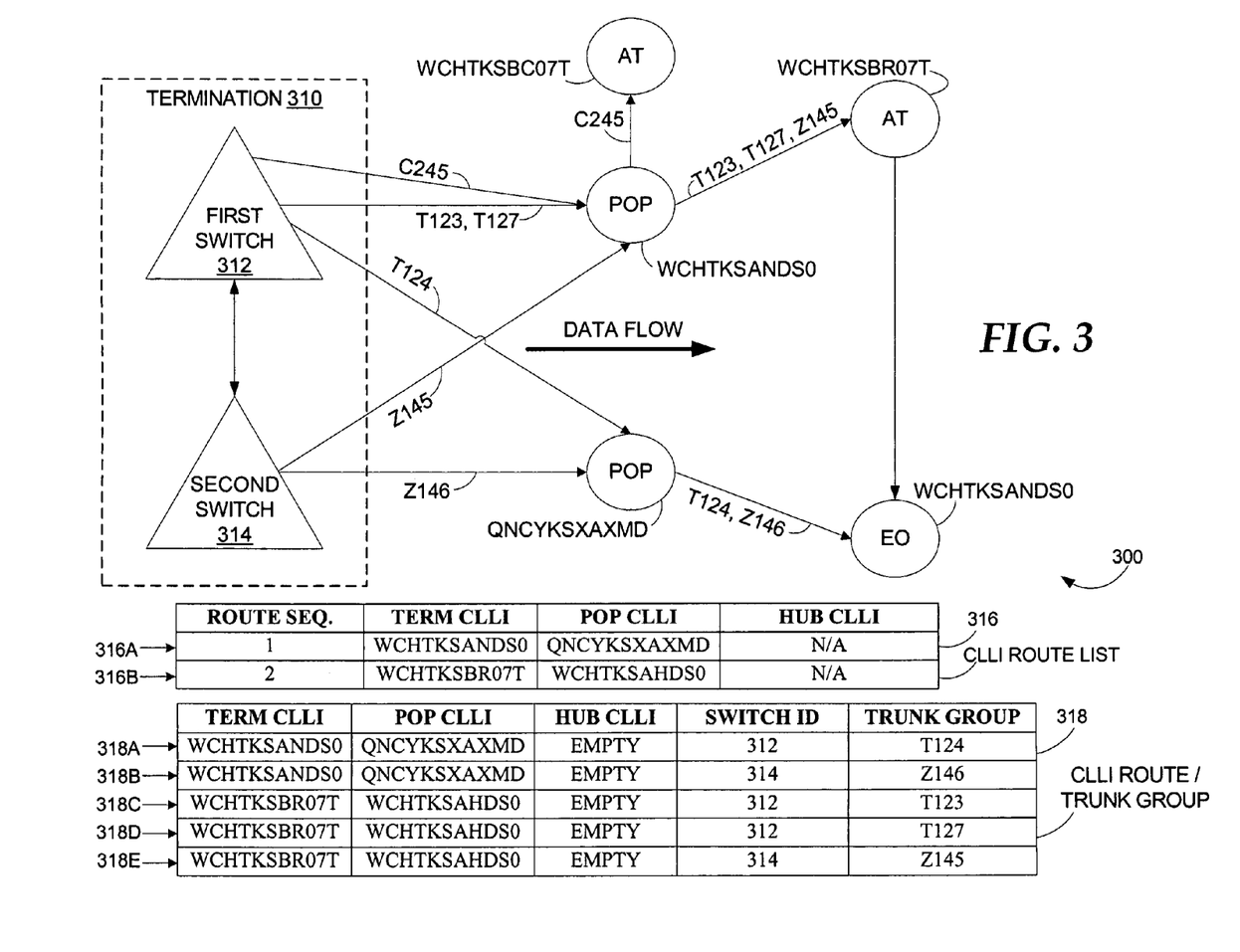
FIG. 3 depicts a data-flow diagram, a CLLI route list, and a CLLI Route-to-Trunk-Group association table in accordance with an embodiment of the present invention.

Turning now to FIG. 3, a data flow diagram is referenced generally by the numeral 300. Data flow diagram 300 illustratively represents a simplistic communications network where multiple trunk groups terminate to a common element. Updating switches in situations where multiple trunk groups terminate to the same element is a difficult task. The various identifiers included in FIG. 3 aid understanding of the present invention and are consistent with the scheme with which one of ordinary skill in the art would be familiar.

As shown, first switch 312 is coupled to two POPs. Moreover, first switch 312 has two routes or trunk groups terminating to the same POP. Similarly, second switch 314 can route data across two communications paths, Z145 or Z146, to ultimately reach a common destination, an end office having identifier WCHTKSANDS0. As previously mentioned, an object of the present invention is to update first switch 312 and second switch 314, elements of a termination point 310. Consider a first Term CLLI/POP CLLI pair—WCHTKSANDS0 and QNCYKSXAXMD— illustrated in row 316A of CLLI route list 316. As shown in row 316A, this Term CLLI/POP CLLI pair defines a first route sequence. A second illustrative Term CLLI/POP CLLI pair is shown that defines a second route sequence by Term CLLI WCHTKSBR07T and POP CLLI WCHTKSANDS0. To not obscure the invention, hub CLLIs are not provided but are contemplated within the scope of the invention. The present invention can receive a Term/POP CLLI pair and return all of the switch IDs and trunk groups associated with that Term CLLI/POP CLLI pair.

An instance of CLLI route/trunk-group table 114 is provided in FIG. 3 and specifically referenced by numeral 318. CLLI route/trunk-group table 318 has five rows denoted as 318A, 318B, 318C, 318D and 318E. Each of these rows (318A-318E) correspond to trunk group data in flow diagram 300. Thus, row 318A denotes that termination CLLI WCHTKSANDS0 and POP CLLI QNCYKSXAXMD are respectively associated with switch ID 312 and trunk group T124. The other Term CLLI/POP CLLI pairs similarly relate and identify corresponding switch IDs and trunk groups.

Returning to route sequence 1 identified in row 316A of CLLI route list 316, table 318 can be queried for the Term/POP CLLI pair shown. Thus, a query can be done against Term CLLI WCHTKSANDS0 and POP CLLI QNCYKSXAXMD. Such a search would return the data in records 318A and 318B of table 318. From rows 318A and 318B, a translations analyst can be provided with all of the switch IDs in trunk groups associated with the provided Term/POP CLLI pair, which in this case would be switches 312 and 314 and trunk groups T124 and Z146. Thus, application 122 would then update first switch 312 to route data for the given NPA-NXX range across trunk group T124. Similarly, application 122 would also automatically generate a switch tuple 124 for updating second switch 314 to route data to the given NPA-NXX range across trunk group Z146.

For another example, consider route sequence 2, defined by row 316B in CLLI route list 316. In this situation, suppose a user wishes to update the necessary switches to route data bound for a certain NPA-NXX range. According to an embodiment of the invention, application 122 can automatically identify and update all of the necessary switches when provided a desired termination CLLI and POP CLLI. Thus, a user would provide termination CLLI WCHTKSBR07T and POP CLLI WCHTKSANDS0 to application 122 along with the NPA-NXX range 132 and any other input parameters. Application 122 would then query CLLI route/trunk-group table 318 for the provided Term/POP CLLI pair and return rows 318C, 318D, and 318E. Application 122 would then identify that switch 312 routes data bound for the provided NPA-NXX range across trunk group T123 and trunk group T127. Moreover, application 122 would automatically generate and send the necessary switch-update transaction to update switch ID 314 to route data bound for the provided NPA-NXX range across trunk group Z145.

Figure 4:
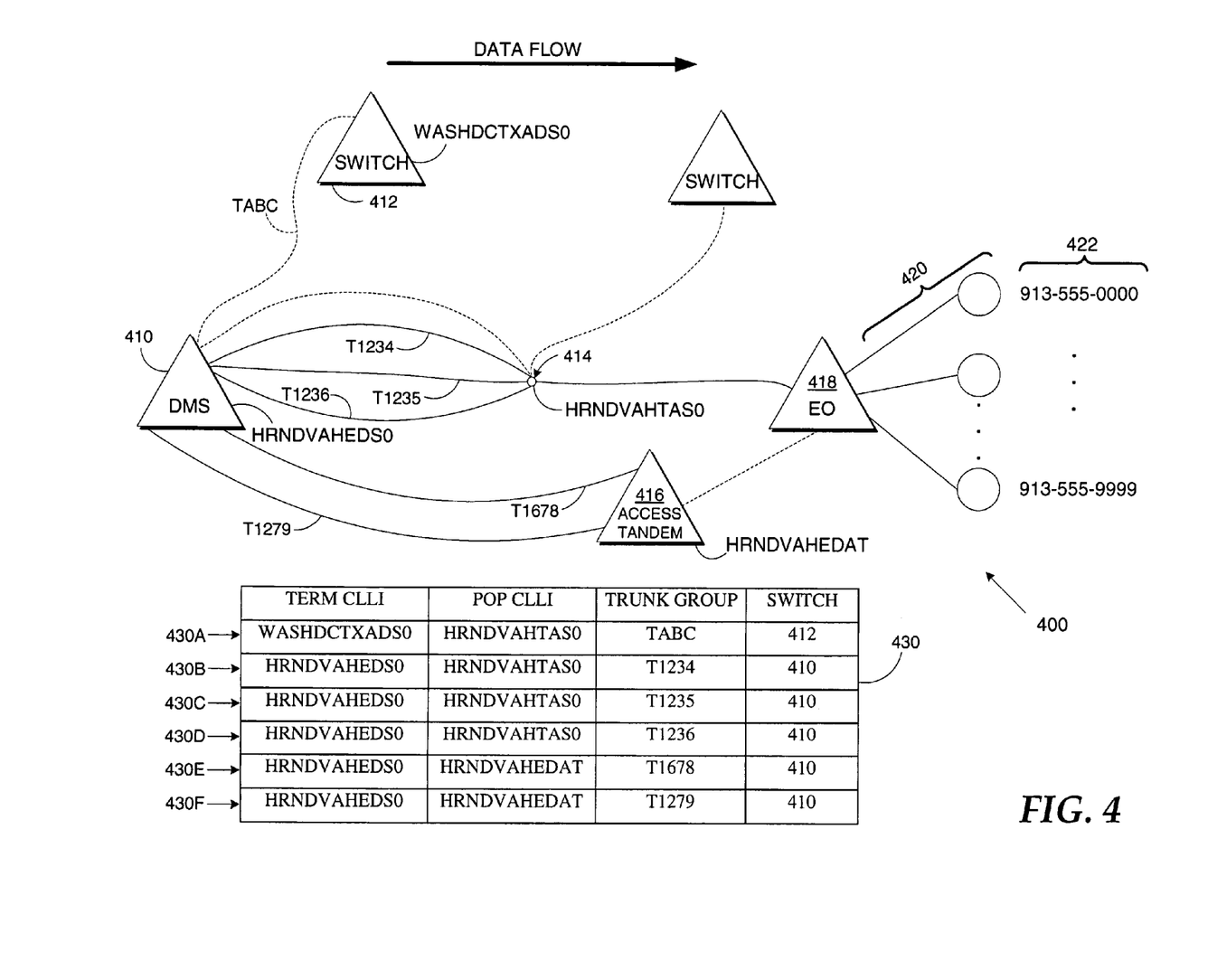
FIG. 4 depicts an additional data-flow diagram and route table in accordance with an embodiment of the present invention.

Turning now to FIG. 4, another data-flow diagram is provided to illustrate a method of updating a telecommunication switch in accordance with an embodiment of the present invention. As shown, data flows from left to right. FIG. 4 includes a flow diagram 400 and another instance of a CLLI Route/trunk-group table 430. Flow diagram 400 includes a first switch 410, second switch 412, point of presence 414, an access tandem 416, and end-office 418, which is coupled to a set of end-user network elements associated with an NPA-NXX range 422.

As with FIG. 3, identifiers are chosen to be representative of those that with which one skilled in the art would be familiar. Accordingly, switch 412 is associated with a CLLI of WASHDCTXADS0, switch 410 is associated with a CLLI of HRNDVAHEDS0, POP 414 is associated with CLLI HRNDVAHTAS0, and access tandem 416 is associated with CLLI HRNDVAHEDAT. Switch 410 is coupled to POP 414 by three trunk groups, T1234, T1235, and T1236.

Table 430 summarizes the relationships between the termination CLLIs, the POP CLLIs, the trunk groups, and the switch IDs. Table 430 includes six rows labeled 430A-430F. For this example, assume that NPA-NXX range 422 has recently been provided, which would require updating switch 410. To update switch 410, which has multiple trunk groups terminating to a single POP 414, a user need only provide the termination CLLI and the pop CLLI, which in this situation would be HRNDVAHEDS0 and HRNDVAHTAS0 respectively.

Application 122 would then query table 430 (which is an instance of CLLI Route/Trunk-Group table 114). Table 430 would be queried for the given termination CLLI and POP CLLI. Querying table 430 would return the data in rows 430B, 430C, and 430D. The data returned would indicate that trunk groups T1234, T1235, and T1236 as well as switch ID 410 can be used to route data to the NPA-NXX range 422. Thus, having returned switch ID 410, application 122 would then automatically update switch 410 by creating one or more switch tuples that, when processed by switch 410, would instruct data bound for the specified NPA-NXX range 422 to be routed across trunk groups T1234, T1235, and/or T1236.

As previously described, business rules 138 can be used to assign a trunk group order so that certain data of certain types will be communicated across trunk groups T1234, T1235, and T1236 in a hierarchy. That is, voice data may be transmitted over a trunk group T1234, while packet data may be transmitted over trunk group T1235.

As can be seen, the present invention and its equivalents are well-adapted to identify switch and trunk-group combinations and update switches, or other components, required to implement a dial plan. Many different arrangements of the various components depicted, as well as components not shown, are possible without departing from the spirit and scope of the present invention. For example, a trunk reroute table can be include in FIG. 1 to add reroute data. Those skilled in the art will appreciate the litany of additional network components that can be used in connection with the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more computer-readable media having computer-useable instructions embodied thereon for performing a method of identifying switch and trunk-group combinations required to implement a dial plane, the method comprising:
 receiving one or more data-destination identifiers;
 receiving a Point-of-Presence (POP) Common Language Location Identification (CLLI);
 receiving a Termination CLLI;
 identifying one or more switch and one or more trunk groups associated with the POP CLLI and the Termination CLLI;
 receiving one or more input parameters;
 without user input, automatically generating one or more switch-update transactions; and
 communicating the one or more switch-update transactions to the one or more switches.

2. The media of claim 1, wherein receiving the one or more data-destination identifiers includes receiving a dialing plan, wherein the dialing plan includes an NPA-NXX code, NPA-NXX-LINE code, or range of NPA-NXX codes.

3. The media of claim 2, wherein the POP CLLI corresponds to a target routing destination.

4. The media of claim 3, wherein the termination CLLI identifies a switch that will communicate data to the POP CLLI.

5. The media of claim 4, wherein identifying one or more switch and one or more trunk groups includes querying a record set that associates a plurality of CLLI routes with a respective plurality of trunk groups.

6. The media of claim 5, wherein receiving one or more input parameters includes receiving one or more of the following:
 destination information describing the identified one or more switches;
 cost information associated with routing data through the identified one or more trunk groups; and
 outpulse-digits data.

7. A method for automatically updating a telecommunications device to route data based on a dialing-plan modification where the telecommunications device terminates to multiple destinations, the method comprising:
 receiving a source Common Language Location Identification (CLLI);
 receiving a destination CLLI; and
 without user intervention,
 (1) determining a plurality of pathways between the source CLLI and the destination CLLI; and
 (2) identifying one or more switches that need to be updated in order to direct data based on the dialing-plan.

8. The method of claim 7, wherein the source CLLI corresponds to a first network element that directs data to one or more communications components.

9. The method of claim 8, wherein the first network element is a telecommunications switch.

10. The method of claim 9, wherein the destination CLLI corresponds to a second network element that receives data from the first network element, wherein the second network element includes a telecommunications switch, tandem, or end office (EO).

11. The method of claim 10, wherein determining the plurality of pathways includes identifying a plurality of trunks or trunk groups that can communicate data from the source CLLI to the destination CLLI.

12. The method of claim 11, wherein identifying a plurality of trunks or trunk groups includes providing the source CLLI and the destination CLLI as parameters to a database query, wherein the database relates a plurality of source CLLIs and destination CLLIs to a respective plurality of trunks or trunk groups.

13. The method of claim 7, further comprising retrieving one or more input parameters.

14. The method of claim 13, wherein retrieving one or more input parameters includes retrieving a destination-address range, wherein the destination-address range includes one or more NPA-NXX codes.

15. The method of claim 14, further comprising automatically generating one or more switch-update transactions and respectively communicating the one or more switch-update transactions to the one or more identified switches.

16. One or more computer-readable media having computer useable instructions embodied thereon for performing the method of claim 7.

17. A computer-implemented method for updating a telecommunications switch to route data associated with one or more NPA-NXX codes, wherein the switch terminates to one or more destinations, the method comprising:
    receiving a source network-element identifier corresponding to a transmitting network element;
    receiving a destination network-element identifier corresponding to a receiving network element;
    receiving the one or more NPA-NXX codes;
    automatically identifying all available communications pathways between the first network element and the second network element upon which data bound for the one of more NPA-NXX codes can be routed;
    automatically obtaining profile information associated with the destination network element; and
    without use intervention, automatically generating a routing command that, when processed by the transmitting network element, configures the transmitting network element to route data bound for the NPA-NXX codes across the one or more identified communications pathways.

18. The method of claim 17, wherein the transmitting network element and the receiving network element are communications switches.

19. The method of claim 18, wherein the profile information includes vendor-specific information related to the receiving network element.

20. The method of claim 19, wherein the profile information further includes cost information associated with directing data across all or a portion of the identified communications pathways.

21. The method of claim 20, wherein generating the routing command includes generating a switch-update transaction.

22. The method of claim 17, further comprising automatically communicating the routing command to the receiving network element.

23. One or more computer-readable media having computer-useable instructions embodied thereon for performing the method of claim 22.

24. A computer-implemented method for automatically assigning an NPA-NXX range to an end office, the method comprising:
    receiving a switch identifier;
    receiving a Point of Presence (POP) identifier;
    based on the switch identifier and the POP identifier, automatically identifying a plurality of communications pathways associated with the switch identifier and the POP identifier; and
    without user intervention, automatically updating a switch associated with the switch identifier to route data bound for the NPA-NXX range through the identified plurality of communications pathways.

25. The method of claim 24, wherein the switch identifier and the POP identifier are respective Common Language Location Identification (CLLI) codes.

26. The method of claim 25, wherein automatically updating the switch comprises:
    receiving demographic information related to the switch;
    generating one or more tuples based on the demographic information; and
    transmitting the one or more tuples to the switch for processing.

\* \* \* \* \*